United States Patent
Jang

[11] Patent Number: 5,234,638
[45] Date of Patent: Aug. 10, 1993

[54] SURFBOARD MAKING PROCESS

[76] Inventor: Jinn-Fa Jang, No. 66-19, Shen Keng, Shen Keng Tsun, Kuan Miao Hsiang, Tainan Hsien, Taiwan

[21] Appl. No.: 112,760

[22] Filed: Jul. 13, 1992

[51] Int. Cl.$^5$ .............................. B29C 67/22
[52] U.S. Cl. .................. 264/45.4; 264/46.6; 441/74
[58] Field of Search .............. 441/74; 264/45.4, 46.6, 264/55, DIG. 9, DIG. 10

[56] References Cited

U.S. PATENT DOCUMENTS

| | | | |
|---|---|---|---|
| 2,865,800 | 12/1958 | Stasny | 264/45.4 |
| 2,977,639 | 4/1961 | Barkhuff, Jr. et al. | 264/45.4 |
| 2,989,783 | 6/1961 | Slapnik | 264/45.4 |
| 4,383,955 | 5/1983 | Rubio et al. | 264/46.6 |
| 4,798,549 | 1/1989 | Hirsch | 264/45.4 |
| 4,908,170 | 3/1990 | Kurimoto | 264/46.6 |
| 4,961,715 | 10/1990 | Shanelec | 264/DIG. 16 |
| 5,004,572 | 4/1991 | Kurimoto | 264/46.6 |

FOREIGN PATENT DOCUMENTS 3206334 9/1983 Fed. Rep. of Germany ........ 441/74
3612775 10/1987 Fed. Rep. of Germany ........ 441/74

Primary Examiner—Allan R. Kuhns
Attorney, Agent, or Firm—Varndell Legal Group

[57] ABSTRACT

A surfboard making process including the steps of preparing a polyethylene bag to hold a foamed EPS (expanded polystyrene), treating the polyethylene bag with the foamed EPS through a secondary foaming process, and then putting the product thus obtained from the secondary foaming process in the molding cavity of a molding die for treating into a surfboard by a steam bath.

2 Claims, 2 Drawing Sheets

SURFBOARD MAKING PROCESS

BACKGROUND OF THE INVENTION

The present invention relates to a surfboard making process which uses a polyethylene bag to hold a foamed EPS (expanded polystyrene) and lets it be treated through a secondary foaming process so as to form into a durable surfboard.

A surfboard is a long narrow buoyant board as of lightweight wood or glass fiber covered foam used in the sport of riding in toward shore on the crest of a wave. According to conventional surfboard making processes, a surfboard may crack or wear off easily, more particularly after long uses.

SUMMARY OF THE INVENTION

The present invention eliminates the aforesaid problems. It is therefore the main object of the present invention to provide a surfboard making process for making durable surfboards. According to the present invention, a surfboard is made by containing a foamed EPS (expanded polystyrene) inside a polyethylene bag for receiving a secondary foaming process, and then putting the bag in a molding die to receive a treatment through a steam bath for shape setting.

DETAILED DESCRIPTION OF THE PREFERRED EMBODIMENT

Figure 1:
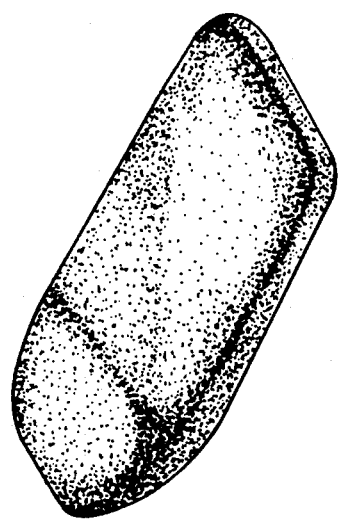
FIG. 1 is an elevational view of a surfboard as constructed in accordance with the present invention.
Figure 2:
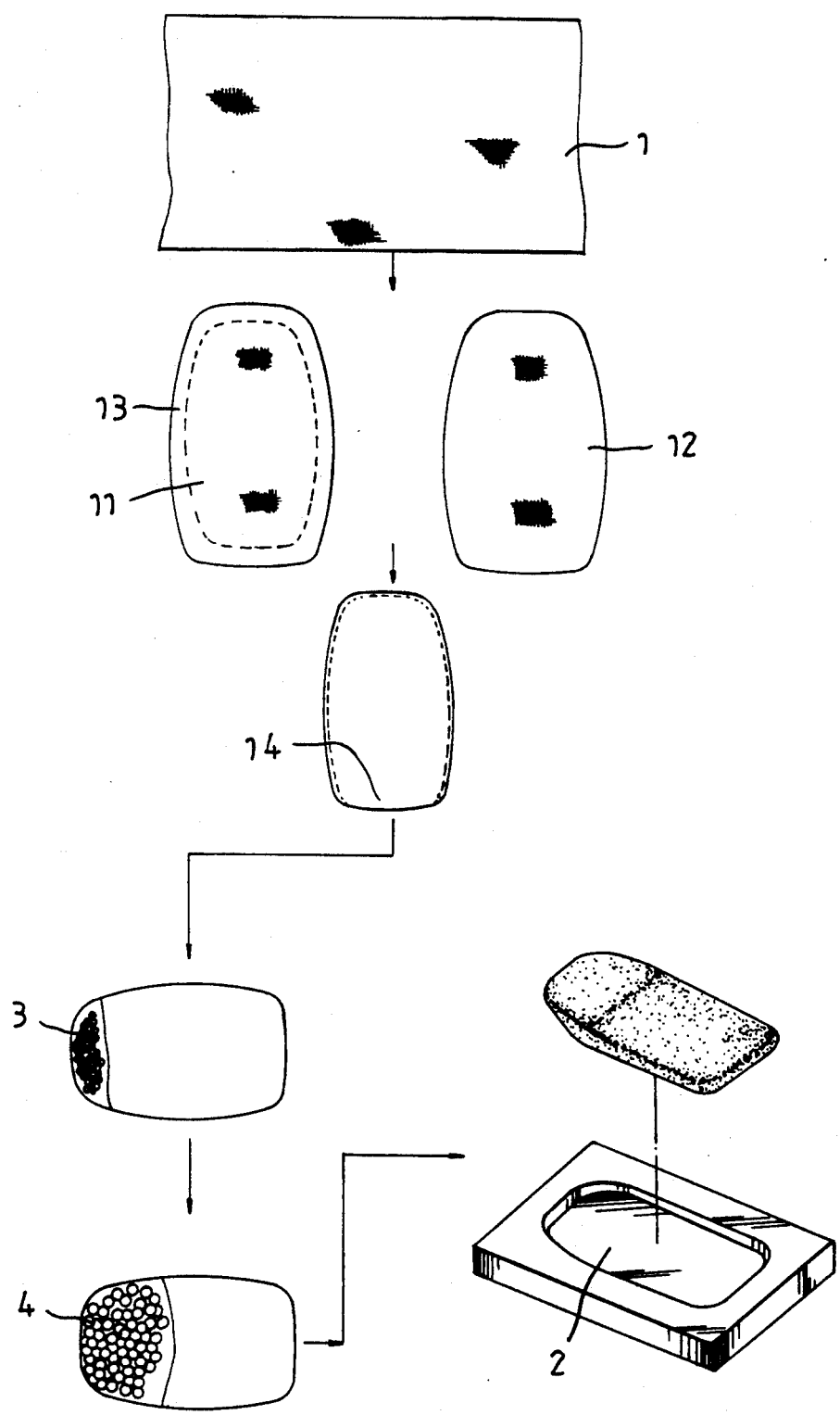
FIG. 2 is a production flow chart according to the present invention.

Referring to FIG. 2, a polyethylene non-woven cloth 1 is cut into two equal pieces 11,12 in size relatively larger than the cavity 2 of the molding die to be used. For cutting the polyethylene non-woven cloth 1, a heat cutter may be used so that the edges after cut can be simultaneous sealed. The overhung portion 13 around the border of each piece 11 or 12 is provided for seaming. The two equal pieces 11,12 are then seamed into a bag with an opening 14 left for putting a primarily foamed EPS (expanded polystyrene). The bag thus obtained is turned inside out so that the seam line is concealed from the outside. After a proper quantity of foamed EPS has been put into the bag, the opening 14 is sealed, and then the bag with foamed EPS is treated through a secondary foaming process. After the process of secondary foaming, the bag is put in the cavity 2 of the molding die and treated through a steam bath for form setting. After setting, a finished surfboard is obtained (see FIG. 1). The shape of the cavity 2 of the molding die may be variously embodied according to the desired designs.

A surfboard as made according to the aforesaid surfboard making method is functional and durable in use. However, it is obvious to those skilled in the art that various changes may be made without departing from the scope and basic teachings of the invention and the invention is not to be considered limited to what is described in the specification.

I claim:

1. A surfboard making process comprising the steps of:
   a: preparing a molding die having a molding cavity for molding a surfboard;
   b: cutting a polyethylene non-woven cloth into two equal pieces in size relatively larger than the cavity on said molding die;
   c: seaming said two equal pieces into a polyethylene bag with an opening for inserting a foamed expanded polystyrene;
   d: turning said polyethylene bag inside out, and then sealing the opening on said polyethylene bag after a foamed expanded polystyrene has been put inside the said polyethylene bag;
   e: treating the polyethylene bag and the foamed expanded polystyrene thus obtained from the step "d" through a secondary foaming process; and
   f: putting the secondarily foamed product thus obtained from step "e" in the molding cavity of said molding die and treating said secondarily foamed product by exposure to a steam bath so as to form a finished surfboard.

2. The surfboard making process according to claim 1, wherein the molding cavity of said molding die is designed according to shape of the surfboard to be produced.

* * * * *